Figure 1:
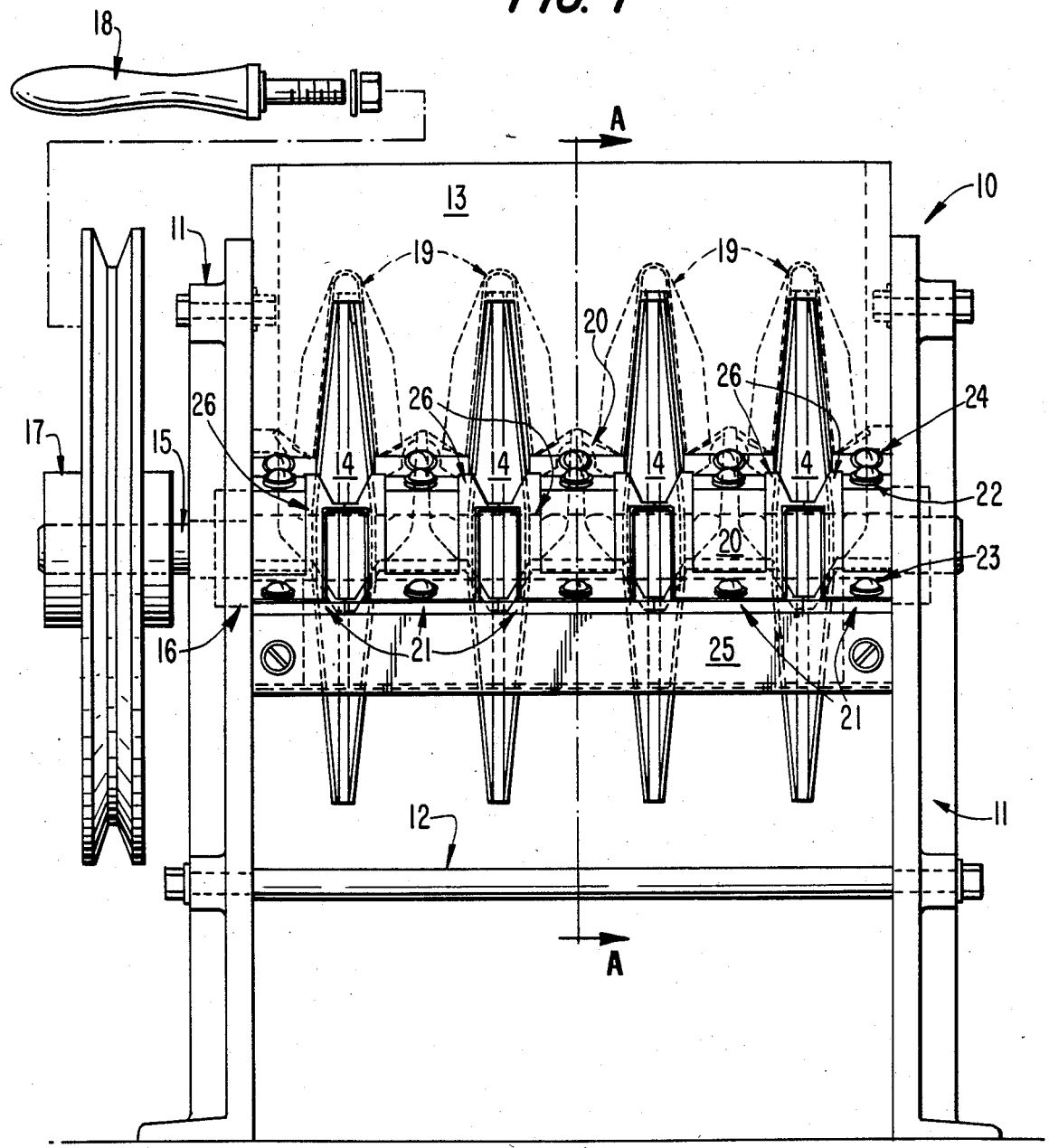
Figure 2:
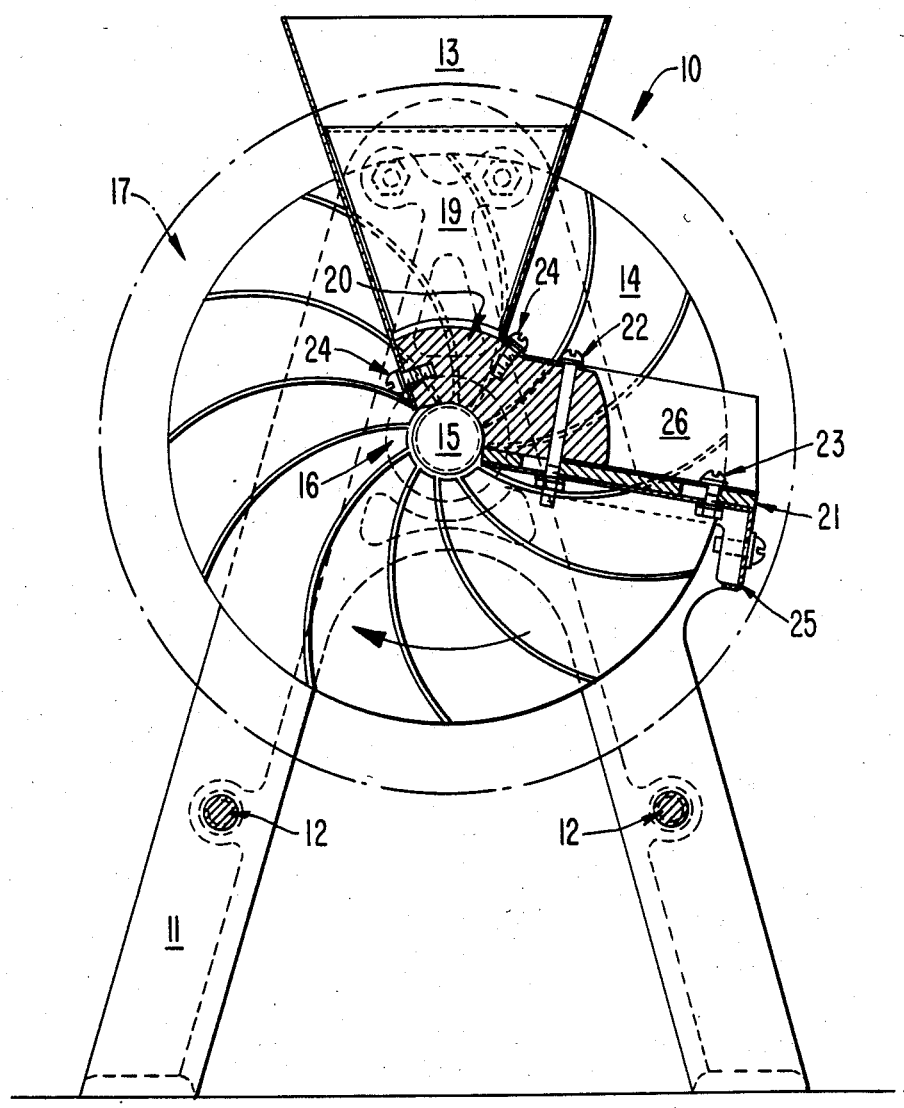

United States Patent [19]

Spencer

[11] Patent Number: 4,658,712
[45] Date of Patent: *Apr. 21, 1987

[54] COFFEE DEPULPING MACHINE

[76] Inventor: Stanley L. Spencer, Route 3, Box 129-A, Gray, Ga. 31032

[*] Notice: The portion of the term of this patent subsequent to Aug. 21, 2000 has been disclaimed.

[21] Appl. No.: 228,998

[22] Filed: Jan. 27, 1981

[51] Int. Cl.⁴ .................. A23N 5/00; A23N 15/10
[52] U.S. Cl. ........................... 99/576; 99/574; 99/579; 99/610; 99/622
[58] Field of Search ............... 99/568, 520, 574–576, 99/600, 609, 610, 521, 612–615, 617–623, 635–639, 567; 241/260, 251, 261.1–261.3, 296–298

[56] References Cited

U.S. PATENT DOCUMENTS

| | | | |
|---|---|---|---|
| 232,714 | 9/1880 | Henington | 99/622 |
| 777,877 | 12/1904 | Abele | 99/610 X |
| 879,211 | 2/1908 | Tebyrica et al. | 99/622 X |
| 1,066,344 | 7/1913 | Urgelles | 99/610 X |
| 1,342,692 | 6/1920 | Pape | 99/575 |
| 1,496,265 | 6/1924 | Grant | 99/609 |
| 1,710,459 | 4/1929 | Romero | 99/622 X |
| 2,230,790 | 2/1941 | Anderson | 99/574 |
| 4,131,061 | 12/1978 | Skeen | 99/621 X |

Primary Examiner—Timothy F. Simone
Attorney, Agent, or Firm—Roylance, Abrams, Berdo & Goodman

[57] ABSTRACT

A depulping machine comprises a frame, a shaft mounted on the frame and at least one circular disk mounted for rotation on the shaft. The shaft passes perpendicularly through the disk. The disk tapers in a radially outward direction of the shaft and has spirally radiating ribs projecting laterally from opposite faces of the disk. A hopper is supported on the frame above the disks. Adjustable depulping plates are attached to the frame adjacent to, but spaced from the disks, and have cutting edges which cooperate with independently adjustable guide brackets and the disk faces and ribs to force pulp between the disk and the plates and to push beans, pits and the like on the plates along the edges, and out the machine.

16 Claims, 2 Drawing Figures

COFFEE DEPULPING MACHINE

This invention relates to an apparatus used to remove the cherry pulp from the coffee bean at the time the coffee is picked from the plant. It has been proven difficult to produce a conventional coffee depulping machine that is economical to fabricate and efficient in operation.

The primary objects of the present invention are to provide solutions to problems commonly encountered when depulping coffee in a conventional machine. Briefly described the invention uses one or more circular disks mounted on a shaft, the disks being thicker in the center part near the shaft and gradually becoming thinner in the outer perimeter. Embossed veins radiating spirally from the centers of the disks provide the depulping action by shearing the pulp away from the coffee bean and pulling the pulp through an adjustable shearing edge and out the bottom of the machine while pushing the exposed coffee bean along the shearing edge and through an adjustable guide bracket fitted against the disks so as to allow sufficient passage for the coffee bean but not the pulp surrounding it. The exposed beans are then pushed out the openings in the front of the machine. The hopper into which the coffee is first introduced is designed to guide the coffee to the thicker center part of the disks where depulping begins. The obvious advantage is that depulping near the shaft requires much less force than the conventional machine which depulps at the perimeter of a cylinder. Shields located inside the hopper cover the outer perimeter of the rotating disks thus channeling the coffee still in the cherry to stationary feeders located over the shaft and between the disks where the spirally radiating veins pull the coffee into the depulping chambers. Feeding is automatic thus eliminating two gears, a feeder bar and four flat bars found in the conventional machine.

Other and further objects, features and advantages of the present invention will become apparant from the detailed description of the preferred form thereof read in conjunction with the following drawings, in which:

FIG. I is a front elevation of a machine having four disks;

FIG. II is a sectional view along lines "A—A" of FIG. I.

In the drawings the coffee depulping machine of the present invention is designated generally by the reference number 10. Like parts are indicated by similar characters of reference in both views. The invention can best be described with reference to the accompanying drawings. The machine illustrated is supported by a pair of A-frames 11 secured at the bottom by threaded rods 12 and at the top by the hopper 13 being bolted in place at both sides. The disks 14 are mounted on a shaft 15 which passes through a sealed bearing 16 at either extremity. The bearings 16 are set in the two A-frames 11 from the inside and the shaft 15 is turned down so as to form a shoulder which holds the bearings 16 in place once the machine is assembled thus eliminating the need for bearing retainers. A drive pulley 17 is used to turn the shaft 15 in a clockwise rotation as viewed in FIG. II section "A—A". A handle 18 may be installed near the perimeter of the drive pulley 17 for manual operation. The freshly picked coffee is first introduced into the hopper 13 and is guided down into the machine 10 by shields 19 placed over the disks 14 to prevent premature depulping and leakage of pulp out the front of the hopper 13. The shields 19 also serve to reinforce the hopper 13 thus making it a more suitable truss like structure for stabilizing the tops of the two A-frames 11. A series of stationary feeders 20 serve to guide the coffee to the depulping plates 21 being closely located adjacent and adjustable to the disks 14. Depulping plates 21 are located between disks 14 and are tapered toward shaft 15 providing generally triangular spaces that fit the taper of the disks. Adjustment of the depulping plates 21 are achieved by moving the wedge-shaped plates 21 closer to or away from the shaft 15 of the machine 10. Adjustment of the plates toward and away from the shaft will decrease or increase, respectively, the lateral spacing between the disks and the shearing edges of plates 21. Slots through which the mounting screws 22 and 23 pass allow for this simple in and out adjustment. The stationary feeders 20 are fastened to the hopper 13 by machine screws 24 and a third longer screw 22 aids to secure the nose of the feeder 20 to a mounting plate 25 which in turn is fastened to the two A-frames thus making for a more integral simplified construction. Adjustable guide brackets 26 which serve to hold the coffee the correct distance from the rotating disks 14 during depulping and guide the coffee beans out of the machine 10 are secured above the depulping plates 21 and mounting plate 25 by means of a machine screw 23 and the longer machine screw 22 passing through the nose of the feeder 20. The guide brackets 26 are independently adjustable from the depulping plates 21 thus allowing an additional degree of flexibility of adjustment not possible in the cast iron breastplate of the conventional machine. The guide brackets 26 also provided with slots through which the mounting screws 22 and 23 pass are adjusted in the same manner as the depulping plates 21. As compared with the conventional machine with four openings which occupies 0.245 cubic meters of space and weighs approximately 80 kilograms the present machine 10 with the same number of openings is less bulky and lighter, occupying approximately 0.036 cubic meters of space and weighing approximately 19 kilograms. The present machine 10 is more versatile in that it is possible to have from one up to six or eight openings per machine according to the depulping capacity required instead of the usual two, three or four openings of the conventional machine. The spirally radiating veins in the disks 14 enable the machine 10 to operate at a faster velocity thus increasing depulping capacity without imparting damage to the coffee bean. A smaller drive pulley 17 is required thus saving materials and occupying less space.

In operation, the edges of plates 21 are slightly spaced from the ribs on the disks to permit the pulp to pass downwardly between the plates and disks, but are sufficiently close to the faces of the disks to prevent the beans from passing between the plates and the faces of the disks during depulping. The beans or nuts are pushed along the plates adjacent their edges by the ribs on the rotating disks with the aid of guide brackets 26 which hold the coffee cherries or nuts close enough to the faces of the disks to remove the husk, but are sufficiently spaced to allow the bean to pass through the machine unharmed. Shields 19 assist in directing the coffee beans toward a lateral side of a disk. The feeders also assist in this function since they slant toward the shaft and the disk.

From the above description it will be apparent that there is thus provided a device of the character described possessing the particular features of advantage previously stated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not to be limited to the specific features shown, but that the means and construction herein disclosed comprise but one of several modes of putting the invention into effect. The following claim is to be read as encompassing all modifications and adaptations falling in the same category of the aforementioned.

Having thus described my invention, I claim:

1. A depulping machine, comprising:

a frame;

a shaft supported on said frame;

at least one circular disk mounted on said shaft, said shaft passing perpendicularly through a center portion of said disk, said disk tapering in a radially outward direction of said shaft and having spirally radiating ribs projecting laterally from opposite faces of said disk;

a hopper supported on said frame above said disk; and depulping plates attached to said frame adjacent to but spaced from said disk, said plates having edges which cooperate with said disk faces and ribs to force pulp between said disk and said plates and to push beans, pits and the like on said plates along said edges and out a discharge opening.

2. A depulping machine according to claim 1 wherein a plurality of disks are mounted on said shaft; and depulping plates are mounted on said frame adjacent each of said disks.

3. A depulping machine according to claim 1 wherein said shaft is coupled to drive means for rotating said disks, said drive means including a drive pulley on said shaft.

4. A depulping machine according to claim 3 wherein said drive pulley comprises a handle for optional manual operation.

5. A depulping machine according to claim 1 wherein said shaft is mounted by bearings on said frame.

6. A depulping machine according to claim 1 wherein said frame comprise two supports with legs, said supports being secured at tops thereof by said hopper.

7. A depulping machine according to claim 2 wherein said hopper is formed of sheet metal, and comprises reinforcing shields over said disks and stationary feeding mechanisms over said shaft and between said disks.

8. A depulping machine according to claim 1 wherein said depulping plates are adjustably mounted on said frame to vary spacing relative to said disk.

9. A depulping machine according to claim 1 wherein guide brackets are mounted on opposite sides of said disks adjacent said edges.

10. A depulping machine according to claim 9 wherein said depulping plates are adjustably mounted on said frame to vary spacing relative to said disk.

11. A depulping machine according to claim 10 wherein said depulping plates and said guide brackets are coupled to a mounting plate secured to said frame and traversing the width of the machine.

12. A depulping machine according to claim 10 wherein said guide brackets and said depulping plates are independently adjustable.

13. A depulping machine, comprising:

a first member having an outer face with at least one protruding rib;

a second member with a edge adjacent to but spaced from said face and said rib, said rib and said edge being oriented at an angle; and drive means for moving one of said members relative to the other member such that said angle remains substantially constant as said rib moves along said edge during relative movement and an optimum shearing force is applied.

14. A depulping machine according to claim 13 wherein said second member is relatively fixed and said first member is moved by said drive means.

15. A depulping machine according to claim 14 wherein said first member is rotated.

16. A depulping machine according to claim 13 wherein said second member is adjustably mounted relative to said first member.

* * * * *